US012265982B2

(12) United States Patent
Fairchild et al.

(10) Patent No.: US 12,265,982 B2
(45) Date of Patent: Apr. 1, 2025

(54) SYSTEM AND METHOD FOR LINKING VIDEO-GAME ACTIVATION ON CONSOLES TO CONNECTED TELEVISION ADVERTISEMENT DELIVERY

(71) Applicant: tvScientific, Inc., Rolling Hills Estates, CA (US)

(72) Inventors: Jason Fairchild, Rolling Hills Estates, CA (US); David Koye, Richmond, VA (US); Stephan Cunningham, Pasadena, CA (US)

(73) Assignee: tvScientific, Inc., El Segundo, CA (US)

( * ) Notice: Subject to any disclaimer, the term of this patent is extended or adjusted under 35 U.S.C. 154(b) by 0 days.

(21) Appl. No.: 17/710,053

(22) Filed: Mar. 31, 2022

(65) Prior Publication Data

US 2022/0318834 A1     Oct. 6, 2022

Related U.S. Application Data

(60) Provisional application No. 63/169,127, filed on Mar. 31, 2021.

(51) Int. Cl.
| | |
|---|---|
| *H04N 21/458* | (2011.01) |
| *A63F 13/335* | (2014.01) |
| *G06Q 30/0207* | (2023.01) |

(52) U.S. Cl.
CPC ....... *G06Q 30/0209* (2013.01); *A63F 13/335* (2014.09); *A63F 2300/5506* (2013.01)

(58) Field of Classification Search
CPC ............... G06Q 30/0209; A63F 13/335; A63F 2300/5506
See application file for complete search history.

(56) References Cited

U.S. PATENT DOCUMENTS

| | | |
|---|---|---|
| 8,904,418 B1 | 12/2014 | Rowe |
| 10,789,619 B1 | 9/2020 | Kahrl et al. |
| 2001/0054026 A1* | 12/2001 | Choate ................ G06F 11/3409 709/224 |

(Continued)

FOREIGN PATENT DOCUMENTS

| | | | | |
|---|---|---|---|---|
| WO | WO-2012144825 A2 * | 10/2012 | ............. | A63F 13/12 |
| WO | 2017019646 A1 | 2/2017 | | |

OTHER PUBLICATIONS

Internet Advertising: An Interplay among Advertisers, Online Publishers, Ad Exchanges and Web Users, Shuai Yuan,,p. 8, Department of Computer Science, University College London (Year: 2012).*

(Continued)

*Primary Examiner* — Michael Bekerman
*Assistant Examiner* — Darnell A Pouncil
(74) *Attorney, Agent, or Firm* — Patent Law Works LLP (57) ABSTRACT

A system and methods are disclosed for linking video-game activation on gaming consoles to connected television ("CTV") or over-the-top ("OTT") advertisement delivery. This system and method are implemented in a tracking and linking platform that is configured to trigger a "postback" call or signal when a gaming application is activated via a console to solicit advertising. In some embodiments, a "postback" call or signal trigger when different events occur, for example, observing different levels of achievement attained by gamers, in-game purchases or the like.

20 Claims, 7 Drawing Sheets

(56) References Cited

U.S. PATENT DOCUMENTS

| | | |
|---|---|---|
| 2004/0107137 A1 | 6/2004 | Skinner |
| 2006/0169769 A1 | 8/2006 | Boyarsky et al. |
| 2008/0066107 A1* | 3/2008 | Moonka ................. G11B 27/28 725/35 |
| 2009/0170614 A1* | 7/2009 | Herrmann ............... G07F 17/32 463/43 |
| 2009/0259518 A1 | 10/2009 | Harvey et al. |
| 2012/0116868 A1 | 5/2012 | Chin et al. |
| 2012/0254149 A1 | 10/2012 | Ramsay |
| 2013/0014223 A1 | 1/2013 | Bhatia et al. |
| 2013/0166375 A1* | 6/2013 | YoungLincoln ... G06Q 30/0246 709/224 |
| 2013/0339111 A1* | 12/2013 | Ross ..................... G06F 3/0481 463/31 |
| 2014/0052546 A1 | 2/2014 | Phan et al. |
| 2014/0171199 A1* | 6/2014 | David .................... G07F 17/32 463/31 |
| 2014/0237498 A1 | 8/2014 | Ivins |
| 2014/0282655 A1* | 9/2014 | Roberts ............ H04N 21/25891 725/14 |
| 2014/0351041 A1* | 11/2014 | Brown ............... G06Q 30/0246 705/14.45 |
| 2015/0220999 A1 | 8/2015 | Thornton et al. |
| 2015/0238865 A1* | 8/2015 | Jeong ..................... A63F 13/35 463/29 |
| 2015/0348119 A1 | 12/2015 | Ferber |
| 2016/0019587 A1 | 1/2016 | Hueter et al. |
| 2016/0132936 A1* | 5/2016 | Hertel ................ G06Q 30/0269 705/14.66 |
| 2016/0162940 A1 | 6/2016 | Kang et al. |
| 2016/0191962 A1 | 6/2016 | Buddha et al. |
| 2017/0034593 A1 | 2/2017 | Ray |
| 2017/0118533 A1* | 4/2017 | Holtz ................. G06Q 30/0241 |
| 2017/0161793 A1 | 6/2017 | Knapp |
| 2017/0169462 A1 | 6/2017 | Meredith et al. |
| 2017/0372356 A1* | 12/2017 | Frommann ........ G06Q 30/0246 |
| 2018/0343495 A1* | 11/2018 | Loheide ........... H04N 21/47217 |
| 2019/0251603 A1* | 8/2019 | Jaatinen ................. G06N 3/006 |
| 2019/0379924 A1* | 12/2019 | Massoudi ............... H04L 45/72 |
| 2020/0279626 A1 | 9/2020 | Ansari et al. |
| 2021/0144426 A1 | 5/2021 | Navarre et al. |
| 2021/0185407 A1 | 6/2021 | Marshall et al. |
| 2021/0258654 A1 | 8/2021 | Kurzynski et al. |
| 2022/0092638 A1 | 3/2022 | Shankel et al. |

OTHER PUBLICATIONS

International Search Report and Written Opinion for International Application No. PCT/US2022/022942, mailed Aug. 9, 2022, 15 pgs.
EPO Communication Extended European Search Report, Application No. 22782254.1 tvScientific, Inc., mail date Jun. 25, 2024, 10 pgs.

* cited by examiner

SYSTEM AND METHOD FOR LINKING VIDEO-GAME ACTIVATION ON CONSOLES TO CONNECTED TELEVISION ADVERTISEMENT DELIVERY

CROSS REFERENCE TO RELATED APPLICATION

This application claims priority under 35 USC § 119(e) to U.S. Provisional Application No. 63/169,127, entitled "Method for Linking Video-Game Activation on Consoles to CTV Advertisement Delivery" filed on Mar. 31, 2021, the entirety of which application is herein incorporated by reference.

BACKGROUND

1. Field of the Invention

The present invention relates to paid content or advertisement ("ad") placement for connected television viewing over the internet specific to the Video Gaming industry. More particularly, the present invention relates to a system and methods for linking video-game activation on consoles to connected television ("CTV") or over-the-top ("OTT") delivery mechanisms for Ad Delivery.

2. Description of the Related Art

With the popularity and use of the Internet for streaming content, connected television or "CTV" use has grown dramatically in recent years. A CTV is a device that can connect to a TV or a smart TV that facilitates the delivery of streaming video content over the internet. A smart TV is a television with a built-in internet connection and media platform. No additional equipment is required to stream videos. Instead, videos are most often streamed via apps that are downloaded. Other connected devices that connect directly to a traditional television (not a smart television) and the internet and enable apps that are downloaded for viewing videos include Xbox, PlayStation, Roku, Amazon Figure TV, Apple TV, Chromecast, and more. Gaming consoles act as the connected device that provide access to apps from their app stores. With this growth there has been an equally dramatic growth and migration to online advertising. For consumers, "CTV" is a different way to watch TV across multiple types of screens with no cable or satellite subscription required. For advertisers, it's an innovative way to reach a new and unique audience. Today's viewers are increasingly turning to diverse viewing options that don't necessarily involve a traditional television. They are watching smart TVs, laptops, smartphones, game consoles (Nintendo switch, Xbox, PlayStation) and other connected devices such as Amazon Fire, Roku, and Apple TV. However, online advertising presents a complex eco-system involving a complicated interplay between several entities, including online publishers, online advertisers (both informed and uninformed), and users or viewers who browse the internet to view all types of content available on websites that are of interest to them.

Connected TV advertising is becoming a powerful open platform that caters directly to a variety of new applications and services to homes, mainly for the young, middle-aged, and older adult population. Such a robust, tech-savvy audience represents incredible marketing opportunities.

This ecosystem is constantly growing and evolving as new technologies enter the ecosystem. As recognized by those skilled in the art, OTT can refer to premium video content that is streamed over the internet across any app or website, which may or may not require users to subscribe to a traditional "pay TV service." Users may access OTT content via streaming service aggregators, a standalone app, a virtual multichannel video programming distributor ("MVPD") on a TV, desktop, tablet or smartphone. Some refer to OTT as digital video, but that does not distinguish video content as premium, professionally-produced long-form versus free short-form video content. Four main streaming companies account for about 80% of OTT volume. These are Amazon via its app or website, Hulu via its app, Netflix via its app or website and YouTube Premium via its app or website.

With this growth there has been an equally dramatic growth and migration to CTV, OTT, or like advertising. There is a need in the industry for linking video-game activation on consoles to CTV/OTT AD Delivery.

SUMMARY

The present technology overcomes the deficiencies and limitations of prior systems and methods, at least in part by, providing systems and methods for linking video-game activation on consoles to CTV AD delivery. Connecting TVs to the Internet to stream content is growing in popularity and for many, the game console (e.g., Nintendo switch, Xbox, PlayStation) has become the preferred method of making the connection.

In accordance with the present invention, the system is configured to set up a "postback" call when a video game is activated via a console. It should be recognized that a "postback" refers to a request sent by a client to a server from the same page that the user is already working with. For example, ASP.NET was introduced with a mechanism to post an HTTP POST request back to the same page.

The present invention is specific to the Video Gaming Industry—specifically, in some implementations to console games. In accordance with some aspects of the present invention, in a media activation promoting game, the present platform executes CTV media based on multiple targeting criteria. Measurement equals exposure to outcome. Exposure is executing same measurements to determine ad exposure, collect IP, map to devices tethered to that same IP, to create "exposure file" with all of those signals and more. The outcome is an instrument in the game with a "post back" solution that signals the platform when defined events happen in the game, for example, when the user arrives at the landing page website. In other instances, a signal is generated when the user downloads an app or game, that is typically not trackable due to app marketplace black box. In other instances, the user activates the application, and upon activation, the platform initiates a "postback" call, sending along an IP address, etc. In some embodiments, the "Postback" signal is set to trigger against multiple events, including levels achieved, in-game purchases, etc.

The system and methods disclosed below may be advantageous in a number of respects. They provide a novel way to direct relevant advertising in an environment that does not lend itself to transparency.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

The systems and methods of this technology are configured to be implemented in a platform that integrates with other resources in a CTV advertising environment, for example, in a demand-side platform. The present technology provides functionalities for execution in digital advertising for connected television, which may be implemented in a buying and attribution platform that facilitates self-serve solutions that combine fully optimized media buying with comprehensive measurement and attribution. The present invention introduces functionality that is implemented in a demand-side platform to facilitate performance-based advertising in a connected television ("CTV") advertising environment.

A typical demand-side platform integrates with multiple sources such as data management platforms ("DMPs"), ad exchanges, supply sources etc., in an infrastructure that provides secure, elastic, compute capacity in the "cloud" that comprises computers from Virtual Machines and Bare Metal servers to HPC (High Performance Computing), GPU (Graphics Processing Unit), container orchestration and management etc. A demand-side platform is typically integrated in three phases, the first, involving research and set up. The second phase is the development stage and the final phase is testing the integration. Demand-side platforms typically support cross-channel platforms and integrate with all the main ad exchanges. The bidding process is one of the key features of a DSP. This is performed by a component called "bidder" which is responsible for placing bids on advertising inventory during real-time bidding auctions. Usually, multiple bidders will be there to manage all real-time demands simultaneously. An Ad Server is an essential tool for creative management and for storing an ad creative and displaying to a user/viewer when required. Some DSPs have their own ad servers while others may connect to external ad servers depending on the architecture. A "Campaign" tracker helps to record the data regarding the performance of a particular campaign. The data includes clicks, impressions and spends. Once the data is recorded, it will be transferred to a reporting dashboard. The "Campaign" tracker helps the user/viewer to determine the performance of a particular campaign. A reporting database stores all the data received from the "Campaign" tracker. Users/viewers can generate reports by making use of this information. User/viewer data is an important part of the demand side platform ("DSP"), which helps in processing and storing important information about the user/viewer/audience. User/viewer data may include information regarding buying habits, interests, age groups, demographic details etc. Marketers can make use of this information to improve the effectiveness of their campaigns and bring in better results. A user interface is the dashboard where the marketers work on creating, managing and optimizing their campaigns. Ads in DSPs are sold in a few ways, depending on the DSP. DSPs specifically built for performance campaigns such as app-installs, charge a fee based on CPI (Cost per Install) or CPV (Cost per View) for video advertising campaigns. Prices of ad impressions in DSPs are determined by a real-time bidding (RTB) process, that takes place within milliseconds, as a user loads content or interacts with an app.

DSPs are unique as they offer the same capabilities as what ad networks used to provide, with an addition to a suite of audience targeting options. The advantage of DSPs over ad networks is that they provide advertisers with the ability to do real-time bidding on ads, serve ads to a multitude of platforms, track and optimize—all under a single interface. Some targeting options offered by a DSP include—demographic targeting (targets based on demographic features such as age (or age group), job title, gender, education etc.), device targeting (shows viewers ads on specific devices to improve the personalization), re-targeting (targeting existing customers) and so on. DSPs are also used for retargeting campaigns. This is possible because they are able to manage large volumes of ad inventories and recognize ad requests with an ideal target audience, targeted by the advertiser. The DSP in accordance with the present invention offers a self-serve platform, which is an excellent way for businesses and individuals to manage ad campaigns. This offers targeting, bidding, budgeting and optimizing of ad campaigns. A DSP can integrate with a data management platform (DMP) that stores audience data, usually coming from multiple sources. It allows advertisers to create target audiences for their campaign based on 1st party and 3rd party audience data. A DMP acts as a single platform that consolidates online and offline data from various advertisers, creating demographics, behavioral and affinity segments which are then used as targeting options in digital advertising. Performance data from live campaigns are then fed back into the DMP, improving the accuracy of the data. DMPs allow advertisers to reach their specific target markets while reducing wastage in advertising. A DSP provides global reach and effective targeting. Through the present DSP, advertisers can connect to different segments of audiences by applying various targeting criteria. In addition, this DSP specifically address the video-gaming industry for directing advertising in a gaming environment where gaming consoles are used.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a special computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some portions of the present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with special programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages, for example, high level programming languages such as "C," "Java," "Pascal," or "Python," may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network. Each computer may be controlled by one of a variety of operating systems including Microsoft Windows, Macintosh, Linux, Unix, or a Java-based operating system, to name a few.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Architecture Overview

Figure 1:
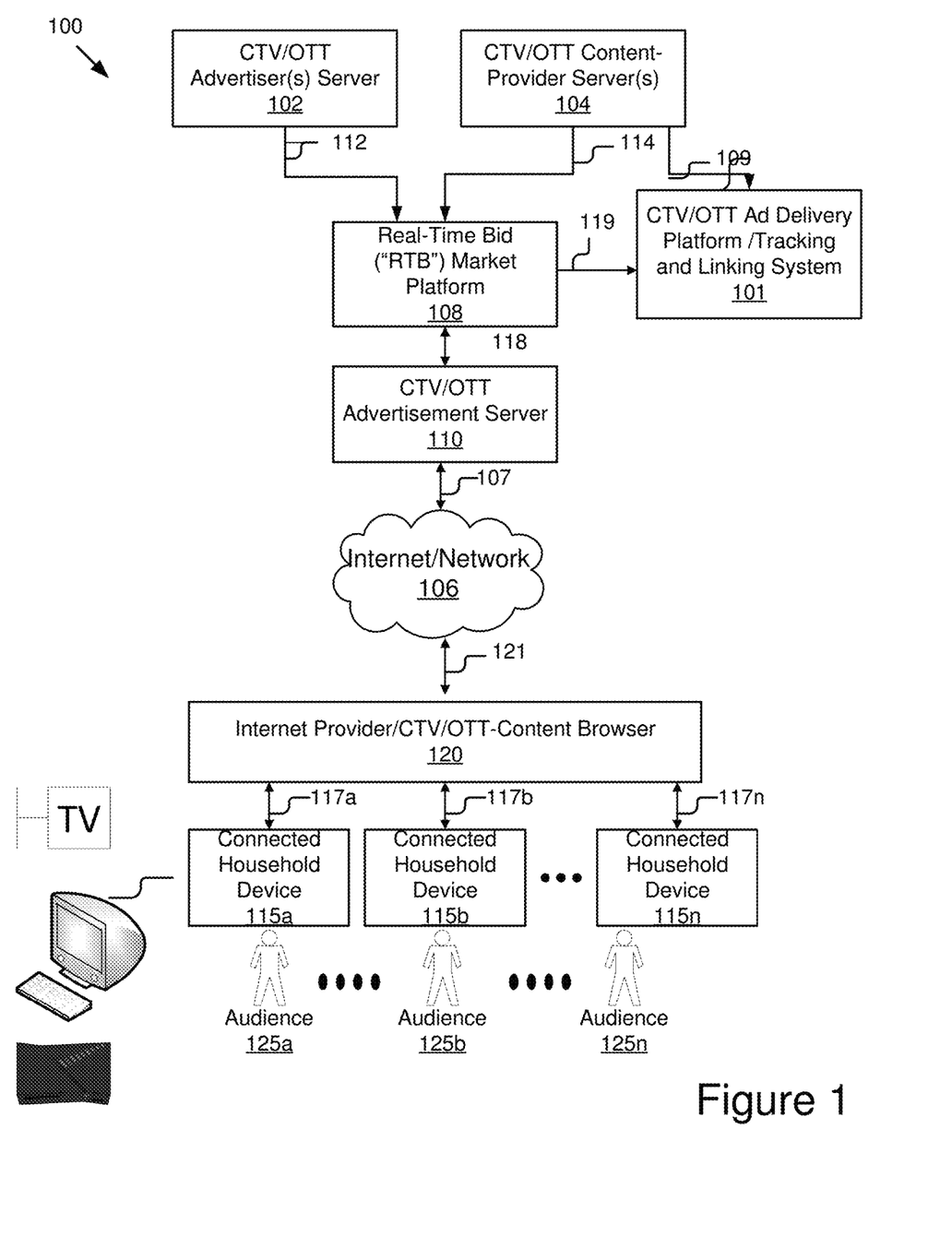
FIG. 1 is high-level block diagram, illustrating an example system and method that may be implemented in a demand-side platform in an advertising environment or is other ways to provide an indication when a game is activated via a console.

FIG. 1 illustrates a block diagram of a system for linking-video-game-activation on gaming consoles to CTV/OTT advertisement delivery shown in an ad placement environment 100 in which the disclosed implementation of the CTV/OTT Ad Delivery platform system 101 connected to the tracking and linking system is operable. The environment 100 includes: an online "CTV" or "OTT" advertiser server or website 102 (representing one or more online advertisers), an online provider or content server or website 104 (representing one or more online content providers), a network 106, and a real-time bidding ("RTB") market platform 108. The online CTV/OTT advertiser server 102 may be a computing system (of one or more computers or processors, either linked or distributed) that submits bids to the real-time bidding market platform 108 to purchase provider video-gaming inventory and have CTV/OTT advertiser advertisements shown on the provider's website. The online advertiser server 102 is illustrated as coupled to the real-time bidding market platform 108 via signal line 112 and the online gaming content server is illustrated as coupled to the real-time bidding market platform 108 via line 114.

The content server 104 may be a computing system that maintains online gaming content that attracts users and contains placeholders for ads (from the ad inventory) that are submitted to the real-time bidding market, for sale to advertisers. The content server 104 is configured to receive signals from the CTV Ad Delivery with linking to video-game-activation platform 101, either directly (not expressly illustrated in FIG. 1) or otherwise. The real-time bidding market platform 108 may be a computing system that provides a real-time and dynamic bidding market that allows advertisers to bid on gaming inventory in real-time. Although only a single advertiser server 102, a single content server 104 and a single network 106 are shown in FIG. 1, it should be recognized by those skilled in the art that there may be thousands or even millions of advertiser servers 102, content servers 104, or networks 106 in a dynamic environment. FIG. 1 is merely provided as one example illustration of the systems 102, 104, and 106, which present the dynamic environment in which the present linking technology may be implemented.

The advertiser server 102 is coupled by signal line 112 for communication with the real-time bidding market 108. Although not explicitly shown in FIG. 1, it should be recognized that any and all the signal lines illustrated in FIG. 1 may route, via the network 106, as illustrated in FIG. 1. The advertiser 102 is coupled to the real-time bidding market 108 to send bids on impressions, and also provides advertisement content, advertising target information, price, or any other information related to the impression or necessary to serve the ad. The real-time bidding market platform 108 represents a real-time bidding market, which allows advertisers to bid on gaming-related inventory in real-time.

The content site 104 is a computing device for hosting a website with any type of gaming content for downloading. The signal line 114 provides information to the real-time bidding market platform 108, about which impressions on the publisher's site are available for the real-time bidding market platform 108. A control line 109 from 104 to 106 indicates content provision from the online content servers.

The network 106 is a conventional type, wired or wireless, and may have any number of configurations such as a star configuration, token ring configuration or other configurations known to those skilled in the art. Furthermore, the network 106 may comprise a local area network ("LAN"), a wide area network ("WAN") (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service ("SMS"), multimedia messaging service ("MMS"), hypertext transfer protocol ("HTTP"), direct data connection, WAP, email, etc.

The real-time bidding market platform 108 is coupled by signal line 118 to an advertisement server 110, which serves advertisements (also referred to as "ads" herein). The advertisement server 110 includes software that receives requests for ad units or slots, submits, and then fulfills those requests with online content. The advertisement server 110 is coupled to the network 106 for communication and interaction with online advertisers 102 and the online publisher content site 104. A user, otherwise referred to as a consumer, viewer or client, designated by reference numeral 125, who is browsing the web is a potential customer of advertising of any type known to those skilled in the art. There may be any number of users or consumers 125a, 125b, through 125n, who are coupled via the network 106 to online publisher sites 104 for viewing content, for example content that is streamed. For example, when a user (125a-125n) navigates to a web page that is supplied by an online publishing content site 104, requests are sent to the online publishing content site 104 (the publisher's server) for content. The user (125a-125n) navigates to a web page via a web browser 120. The browser may be any one of Chrome, Safari, Firefox, Internet explorer or the like.

The content site serves up the content, which includes executable javascript tags. Once these tags are loaded in the user's web browser 120 (via lines 117a, 117b, through 117n), they are executed (via lines 121 and 107) and notify the advertisement server 110 that there is an impression that requires filling. The impression is then submitted to the real-time bidding market platform 108, where advertisers bid to fill the impression with their advertisements. The real-time bidding market platform 108 reads in the market floors for each of the competing advertisers and uses these market floors, along with the advertiser bids, to determine the winner of the auction and their clearing price. In the event that all of the received bids are too low, the Auction may not clear. The operation of the real-time bidding market platform 108 will be described in more detail below with reference to FIG. 2A.

Figure 2:
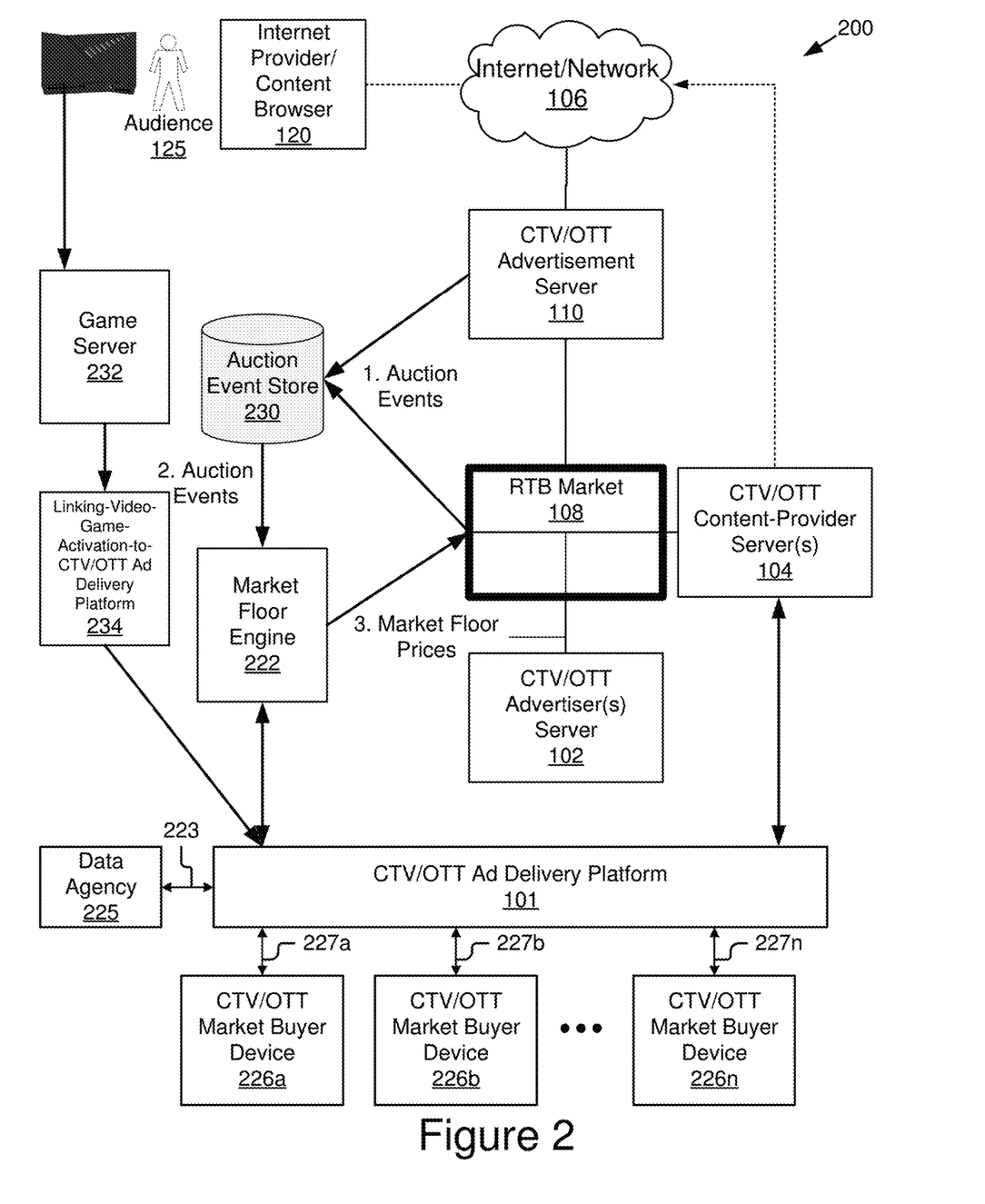
FIG. 2 is a high-level block diagram, illustrating an example linking-video-game-activation-to-CTV/OTT Ad Delivery system, configured to operate in a programmatic environment for CTV/OTT ad placement.

Referring now to FIG. 2A, the real-time bidding market platform 108 implements a real-time bidding market. In the implementations described here, the real-time bidding market platform 108 conducts a market floor auction for CTV/OTT advertisement placement, which is a specialized auction that determines an auction winner, an auction clearing price based on the bids submitted by various advertisers, and per-advertiser market floors that are calculated and distributed by the market floor system 100.

In some implementations, an auction event store 230 may include a large collection of computers arranged in a distributed, computational, and storage grid. The auction event store 230 may store events from the advertisement server 110 and the real-time bidding market platform 108. A market floor engine 220 as illustrated determines and provides market floor prices, which may in some instances be dynamically or selectively set by content providers. In some implementations, the market floor engine 230 may be an analytics engine that processes auction event data in either real-time, near-real-time, or batch mode, determines market floors based on this data, and assesses the revenue impact of using these market floors compared to content-provider "static" floors and/or other benchmarks. The CTV/OTT Ad Delivery Platform 101 may be directly coupled to either market buyer devices 226a, 226, or 226n, via lines 227a, 227b, through 227n, or an agency 225, via line 223, to directly send signals to any of these entities. When a user in the "Audience" downloads a game or otherwise activates a specific game on a Game Server 232, a signal is sent to the Linking-Video-Activation-to-CTV-Ad Delivery platform 234, which is coupled or linked to the CTV Ad Delivery Platform 101.

During a real-time bidding auction, the CTV/OTT advertisement server 110 and real-time bidding market platform 108 generate a number of events that include information about the context in which the real-time bidding auction is occurring. An "event profile" (with the type of information available in the auction bids that are received) may be generated when all of the bids from the advertisers in a real-time bidding auction have been received. The auction event store 230 may store information available in the "auction complete" event generated when an auction has completed. The auction event store 230 may include a large collection of computers arranged in a distributed, computational, and storage grid. The auction event store 230 in some implementations stores events from the advertisement server 110 and the real-time bidding market system 108.

Figure 2B:
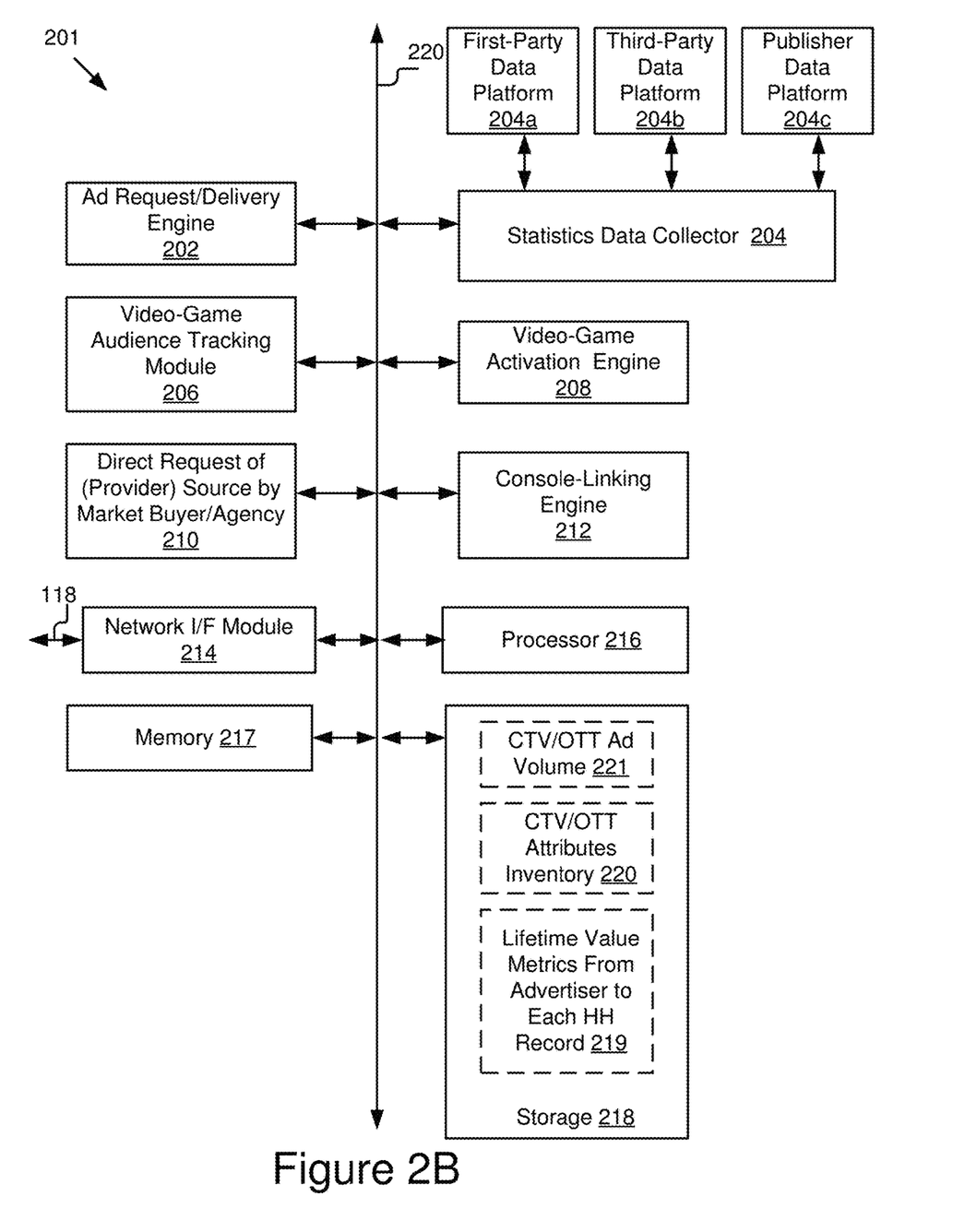
FIG. 2B is a block diagram of the various hardware and software components within and associated with the linking-video-game-activation-to-CTV/OTT Ad Delivery system in accordance with the present invention.

Referring now to FIG. 2B, an example implementation of the hardware structure is illustrated. One or more of the ad request and delivery engine 202, a statistics data collector 204, a video-game audience tracking module 206, a video-game activation engine 208, and a direct request source 210 are software or routines executable by the processor 216. In some implementations, one or more of the delivery engines 202, the statistics data collector 204, the video-game audience tracking module 206, the video-game activation engine 208, and the direct request source 210 store data that, when executed by the processor 216, causes the collectors/modules to perform the operations described below. In yet other implementations, one or more of the ad request and delivery engine 202, the statistics data collector 204, the video-game audience tracking module 206, the video-game activation engine 208, and the direct request source 210 (from publisher) include software programs with instructions executable by the processor 216 to provide the functionality described in the flow charts described below.

In still other implementations, one or more of the delivery engines 202, the statistics data collector 204, the video-game audience tracking module 206, the video-game activation engine 208, and the direct demand source 210 (publisher) are stored in the memory 217 and are accessible and executable by the processor 216. The storage 218 has the CTV/OTT ad volume stored at 221, the CTV/OTT attributes inventory 220, and a "lifetime value metrics from the advertiser to each household 219 with a video game audience. The console-linking engine 212 links the ad request/delivery engine 202 to a video game console upon receiving a signal or trigger from the video-game activation engine 208.

In some instances, a statistics data collector engine 204 may include a multiplier (a) calculation module, a data retrieval module, a classification module (to execute any classification criteria), and data collection engines that may be variously coupled to first-party data platform 204a, a third-party data platform 204b, and a publisher data platform 204c. These engines are operated by one or more processors that comprise an arithmetic logic unit, a microprocessor, a general-purpose controller or some other processor array to perform particular computations as programmed and provide electronic display signals to a display device. The processor 216 is coupled to the bus for communication with the other components. The processor 215 processes data signals and may comprise various computing architectures including a complex instruction set computer (CISC) architecture, a reduced instruction set computer (RISC) architecture, or an architecture implementing a combination of instruction sets. Although only a single processor 216 is referenced here, multiple processors may be included. It will be obvious to one skilled in the art that other processors, operating systems, sensors, displays and physical configurations are possible.

The processor 216 is coupled to a memory that stores instructions and/or data that may be executed by the processor 216. The memory 217 is coupled to the bus for communication with the other components. The instructions and/or data may comprise code for performing any and/or all of the techniques described herein. The memory 217 may be a dynamic random-access memory (DRAM) device, a static random-access memory (SRAM) device, flash memory or some other memory device known in the art.

In one embodiment, storage 218 stores data, information and instructions used by the ad request and delivery engines 202, statistics data collector engines 204, and the direct request of source (from provider) by User/Agency 210 etc. The storage 218 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 218 is coupled by the bus for communication with other components of the analytics index system for impression evaluation and allocation.

One or more of the engines are software or routines executable on the processor. In some implementations, one or more of the engines store data that, when executed by the processor, causes the collectors/modules to perform the operations described below. In yet other implementations, one or more of the engines are instructions executable by the processor to provide the functionality described in the flow charts that follow. In still other implementations, one or more of the delivery engines are stored in the memory and are accessible and executable by the processor 218.

Figure 3:
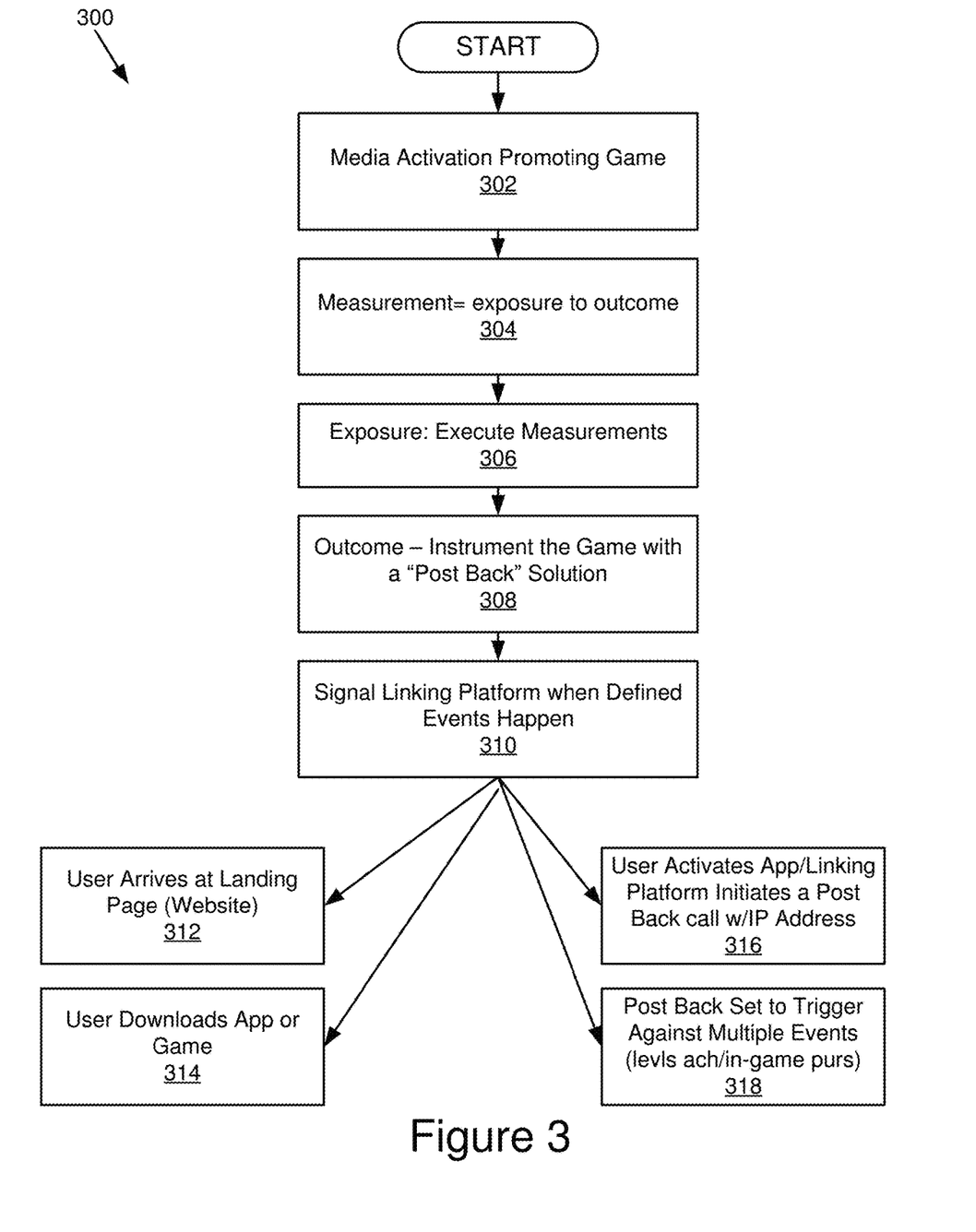
FIG. 3 is a flow chart of a process for linking video-game activation on consoles to CTV/OTT Ad delivery.

Referring now to FIG. 3, a flow chart at 300, represents the flow of the following operations. It should be recognized by those skilled in the art that these operations are specific to the Video Gaming Industry, that is, in some implementations specifically, to use of console games. It should be recognized that some may participate by phone-based access to the games. The flow 300 begins and proceeds to block 302, including one or more operations for media activation for promoting a game. In this operation, the platform 101 executes CTV/OTT media based on multiple targeting criteria that may be used. The flow 300 proceeds to the next block 304, including one or more operations for performing measurements to determine the exposure to outcomes. The flow 300 proceeds to the next block 306, including one or more operations for determining exposure, by executing measurements. The process 300 proceeds to the next block 308, including one or more operations for determining the "outcome," on the instrument of the game by a "post back" solution. The process 300 proceeds to the next block 310, including one or more operations for generating and providing a signal linking the platform 101 when defined events occur. The defined events may be any of several. For example, as described in block 312, a user arriving at the landing page of a website. As another example, a user downloading an application or game, as described in block 314. As yet another example, as described in block 316, a user activating an application and linking platform 101 to initiate a "post back" call with an IP address. Another example may be a "post back" may be set to trigger against multiple events (levels occurring during in-game pursuits), as described by block 318.

Figure 4:
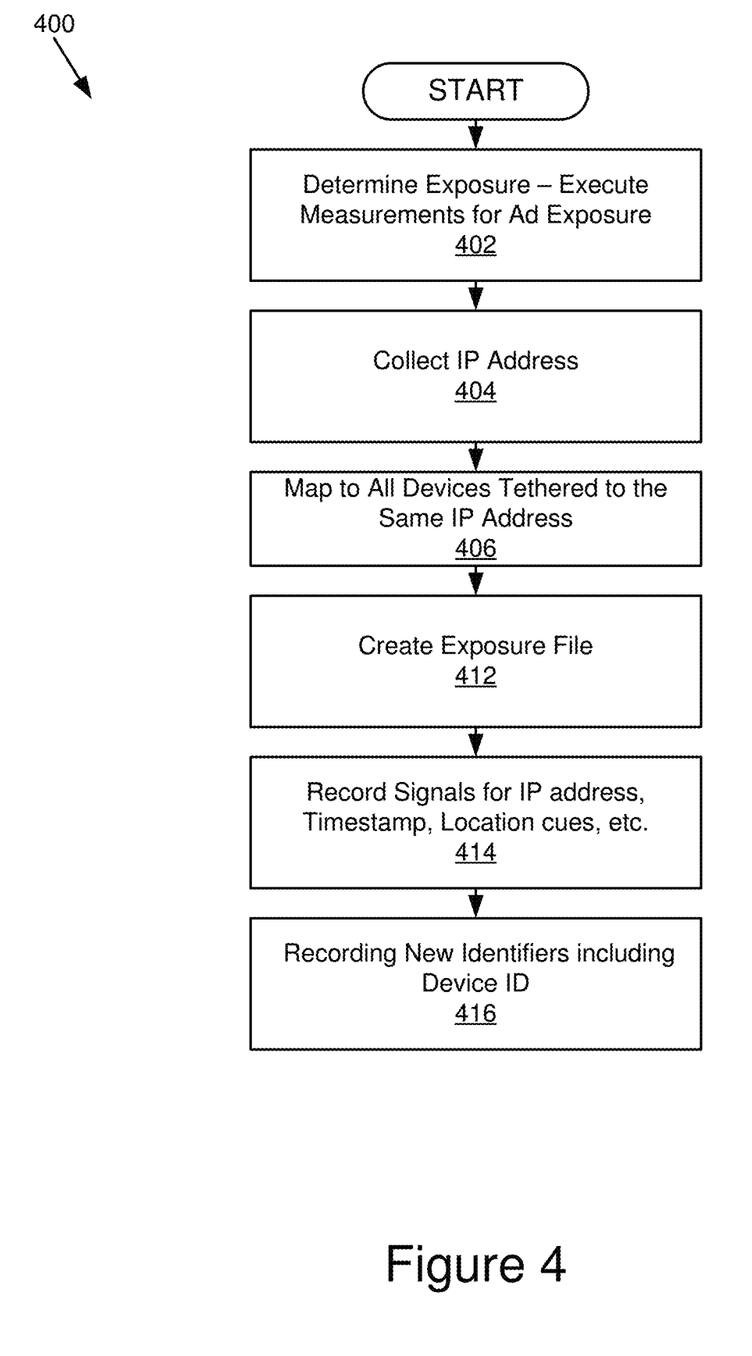
FIG. 4 is a continued flow chart of the process for linking video-game activation on consoles to CTV/OTT Ad delivery.

Referring now to FIG. 4, the flow 400 begins and proceeds to block 402, to determine exposure and execute measurements for advertisement exposure. The process flow 400 continues to the next block 404, including one or more operations for collecting IP addresses. The process flow 400 continues to the next block 406, including one or more operations for mapping to all devices tethered to the same IP address. The process flow 400 proceeds to the next block 412, including one or more operations for creating an "Exposure File" in which exposure data is recorded. The process flow 400 proceeds to the next block 414, including one or more operations for recording signals for IP address, timestamp, location cues etc. The process flow proceeds to the next block 416, including one or more operations for recording new identifiers including a device identification. The "Exposure files" that are created may record all of these signals and more.

Figure 5:
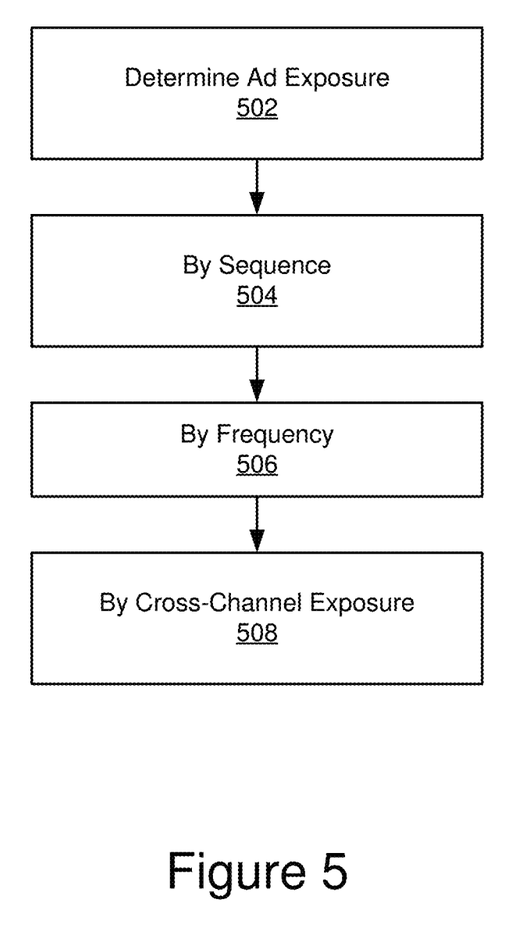
FIG. 5 is a flow chart illustrating the ways by which ad exposure is determined.

Referring now to FIG. 5, in some implementations, advertising exposure as described by block 502 is determined by sequence, as described in block 504. Alternatively, advertising exposure may be determined by frequency, as described in block 506. In some instances, advertising exposure may be determined by cross-channel exposure, as described by block 508.

Figure 6:
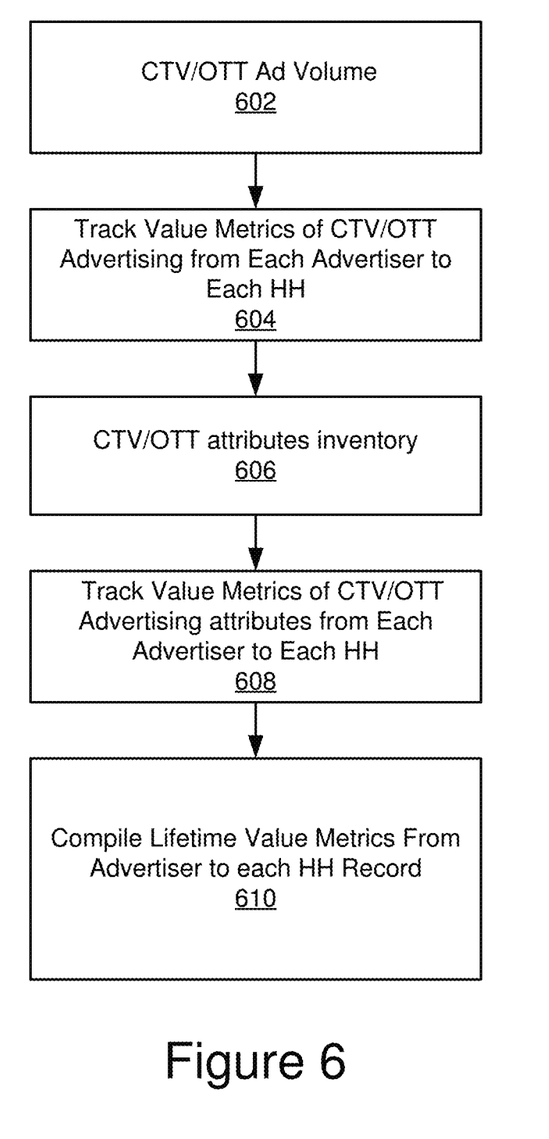
FIG. 6 is a flow chart illustrating the operations involved with determining the CTV/OTT Ad volume and the CTV/OTT attributes inventory.

Referring now to FIG. 6, at block 602, CTV/OTT Ad Volume is tracked. At block 604, value metrics of CTV/OTT advertising from each Advertiser to each household ("HH") is determined and tracked. At block 606, the CTV/OTT attributes inventory is tracked. The next block 608 describes how the value metrics of the CTV/OTT advertising attributes from each advertiser to each household ("HH") is tracked. At block 610, the lifetime value metrics from an advertiser to each household record is tracked.

In the above description, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative.

What is claimed is:

1. A method, comprising:
in a computing device comprising one or more processors and a memory storing executable code with instructions causing the one or more processors to execute a control action via an interface connection, by executing one or more operations configured to:
detect, by at least one of the one or more processors, activation of a video console used to stream publisher content;
generate a signal that sends an IP address, by at least one of the one or more processors, when a user downloads an application or game from a gaming website to link a connected television (CTV) or over-the-top (OTT) advertisement request and delivery engine to the video console to receive an advertisement bid request for streaming content, wherein the signal is generated in one or more defined events including a first instance that a user arrives on a landing page of a website that provides access to a particular game, in a second instance that a user downloads at least one of a program application and a game, and in a third instance that a user activates the application, wherein in each instance the signal is configured to trigger via the video console in the instant that a particular video game is activated via the video console to initiate a linking operation when the one or more defined events occur, and the signal is further set to trigger against multiple events including different actions achieved by the user during in-game pursuits and an in-game purchase by the user;
track at least one of advertisement volume, advertisement from an advertiser to a household, connected television (CTV) or over-the-top (OTT) attributes inventory, and lifetime value metrics from an advertiser and generate a record for the household;
track said signal generated when the user downloads the application or game from the gaming website;
transmit, by at least one of the one or more processors, an advertisement bid response to the advertisement bid request for the streaming content; and
record exposure measurements that determine advertisement exposure, collection of IP addresses, and a map to all devices tethered to a same IP address.

2. The method of claim 1, wherein said signal is also generated in a fourth instance when one or more defined events occur in a game playable via the video console.

3. The method of claim 1, further comprising:
create an exposure file to record exposure to a plurality of different advertisements.

4. The method of claim 3, wherein the one or more operations are further configured to track said signal generated when the user downloads the application and the game from the gaming website.

5. The method of claim 1, wherein said signal is generated when a user activates an application linking said CTV or OTT ad request and delivery engine by an action, said action initiating a call back with an IP address.

6. The method of claim 1, wherein said signal is generated and set to trigger when multiple events occur within said game as it is played via the video console.

7. The method of claim 1, wherein exposure to advertising outcome is determined upon display of advertising provided in the streaming content after linking of video console.

8. A system, comprising:
one or more processors; and
memory storing instructions executable by at least one of the processors and causing the at least one of the processors to:
   detect, by at least one of the one or more processors, activation of a video console used to stream publisher content;
   generate a signal that sends an IP address, by at least one of the one or more processors, when a user downloads an application or game from a gaming website to link a connected television (CTV) or over-the-top (OTT) advertisement request and delivery engine to the video console to receive an advertisement bid request for streaming content, wherein the signal is generated in one or more defined events including a first instance that a user arrives on a landing page of a website that provides access to a particular game, in a second instance that a user downloads at least one of a program application and a game, and in a third instance that a user activates the application, wherein in each instance a signal is configured to trigger via the video console in the instant that a particular video game is activated via the video console to initiate a linking operation when the one or more defined events occur and the signal is further set to trigger against multiple events including different actions achieved by the user during in-game pursuits and an in-game purchase by the user;
   track at least one of advertisement volume, advertisement from an advertiser to a household, CTV or OTT attributes inventory, and lifetime value metrics from an advertiser and generate a record for the household;
   track said signal generated when the user downloads the application or game from the gaming website;
   transmit, by at least one of the one or more processors, an advertisement bid response to the advertisement bid request for the streaming content; and
   record exposure measurements that determine advertisement exposure, collection of IP, and a map to devices tethered to a same IP.

9. The system of claim 8, wherein said signal is also generated in a fourth instance when one or more defined events occur in a game playable via the video console.

10. The system of claim 8, wherein the memory storing instructions executable by at least one of the processors causes the at least one of the processors to further:
   create an exposure file recording exposure to a plurality of different advertisements.

11. The system of claim 9, wherein the one or more operations are further configured to track said signal is generated when the user downloads an application and the game from the gaming website.

12. The system of claim 8, wherein said signal is generated when a user activates an application linking said CTV or OTT ad request and delivery engine by an action, said action initiating a call back with an IP address.

13. The system of claim 8, wherein said signal is generated and set to trigger when multiple events occur within said game as it is played via the video console.

14. The system of claim 8, wherein exposure to advertising outcome is determined upon display of advertising provided in the streaming content after linking of video console.

15. The method of claim 1, wherein a postback call is triggered in the instance that the particular video game is activated via the video console to initiate the linking operation is initiated when more than one defined events occur.

16. The method of claim 15, wherein an exposure file is generated to record the exposure measurements that determine the ad exposure, the collection of IP, and the map to devices tethered to the same IP.

17. The system of claim 8, wherein a postback call is triggered in the instance that the particular video game is activated via the video console to initiate the linking operation is initiated when more than one defined event occurs.

18. The system of claim 17, wherein an exposure file is generated to record measurements that determine ad exposure, collection of IP, and a map to devices tethered to a same IP.

19. A system for linking gaming consoles to an online CTV and OTT advertising delivery engine, comprising:
   a processor; and
   a memory coupled to the processor, the memory storing instructions executable by the processor and causing the processor to:
      detect, by the processor, activation of a gaming console used to access particular gaming content;
      generate a signal that sends an IP address, by the processor, to link the connected television (CTV) and over-the-top (OTT) advertising delivery engine to the gaming console to receive an advertisement bid request for a placeholder in the gaming content, wherein the signal is generated in one or more defined events including a first instance that a user arrives on a landing page of a gaming website that provides access to a particular game, in a second instance that a user downloads a gaming program application, and in a third instance that a user activates the gaming program application, wherein in each instance the signal is configured to trigger via the game console in the instant that a particular video game is activated via the game console to initiate a linking operation when the one or more defined events occur and wherein the signal is further set to trigger against multiple events that include different actions achieved by the user during in-game pursuits and an in-game purchase by the user;
      transmit, by the processor, the advertisement bid request to a real-time bidding market platform, wherein advertisers bid in real-time on advertising inventory;
      track at least one of advertisement volume, advertisement from an advertiser to a household, connected television (CTV) or over-the-top (OTT) attributes inventory, and lifetime value metrics from an advertiser and generate a record for the household;
      track, by the processor, data on clicks, impressions, and spends;
      transmit, by the processor, an advertisement bid response to the advertisement bid request for the placeholder in the gaming content; and generate an exposure file to record measurements that determine advertisement exposure, collection of IP addresses, and a map to devices tethered to a same IP address.

20. The system of claim 19, wherein the data tracked on clicks, impressions, and spends is recorded and transferred to a reporting dashboard.

\* \* \* \* \*